(12) United States Patent
Burton et al.

(10) Patent No.: US 9,718,898 B1
(45) Date of Patent: Aug. 1, 2017

(54) HOMOGENEOUS POLYMERIZATION CATALYST FOR ALPHA OLEFINS

(71) Applicant: LION COPOLYMER GEISMAR, LLC, Geismar, LA (US)

(72) Inventors: Willie Charles Burton, Geismar, LA (US); David G. Ward, Geismar, LA (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 0 days.

(21) Appl. No.: 15/365,848

(22) Filed: Nov. 30, 2016

Related U.S. Application Data

(63) Continuation-in-part of application No. 15/247,630, filed on Aug. 25, 2016, and a continuation-in-part of application No. 14/081,937, filed on Nov. 15, 2013, now abandoned.

(60) Provisional application No. 61/728,607, filed on Nov. 20, 2012.

(51) Int. Cl.
| | |
|---|---|
| *C08F 4/6592* | (2006.01) |
| *C08F 2/06* | (2006.01) |
| *C08F 10/14* | (2006.01) |
| *C08F 4/659* | (2006.01) |

(52) U.S. Cl.
CPC ............. *C08F 4/6592* (2013.01); *C08F 2/06* (2013.01); *C08F 4/65908* (2013.01); *C08F 4/65912* (2013.01); *C08F 10/14* (2013.01)

(58) Field of Classification Search
CPC .... C08F 2/06; C08F 4/65908; C08F 4/65912; C08F 4/6592; C08F 10/14
See application file for complete search history.

(56) References Cited

U.S. PATENT DOCUMENTS

| | | |
|---|---|---|
| 6,225,427 B1 | 5/2001 | Burton et al. |
| 6,696,379 B1 | 2/2004 | Carnahan et al. |
| 2005/0209417 A1 | 9/2005 | Marks et al. |

*Primary Examiner* — Caixia Lu
(74) *Attorney, Agent, or Firm* — Buskop Law Group, P.C.; Wendy Buskop

(57) ABSTRACT

A homogeneous polymerization catalyst system for polymerization or copolymerization of at least one alpha olefin has a Lewis acid, an alkyl aluminum in a hexane or a heptane, and at least one dry metallocene. The at least one dry metallocene has a transition metal compound. The Lewis acid is capable of forming an ion pair with the at least one dry metallocene. The homogeneous polymerization catalyst system produces a poly alpha olefin from alpha olefin monomers or mixed alpha olefins. A produced poly alpha olefin has a kinematic viscosity at 100 degrees Celsius ranging from 1 cSt to 1000 cSt.

7 Claims, No Drawings

HOMOGENEOUS POLYMERIZATION CATALYST FOR ALPHA OLEFINS

CROSS REFERENCE TO RELATED APPLICATION

The present application is a Continuation in Part of co-pending U.S. patent application Ser. No. 15/247,630 filed on Aug. 25, 2016, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS", which is a Continuation in Part of U.S. patent application Ser. No. 14/081,937 filed on Nov. 15, 2013, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS", which claims priority to and the benefit of U.S. Provisional Patent Application Ser. No. 61/728,607 filed on Nov. 20, 2012, entitled "PROCESS FOR THE POLOYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS." These references are hereby incorporated in their entirety.

FIELD

The present embodiment generally relates to a homogeneous polymerization catalyst for alpha olefins employing a particular type of metallocene catalyst and/or Zeigler-Natta catalyst.

BACKGROUND

A need exists for a homogeneous catalyst system for producing poly alpha olefins with low viscosity, that is, unique Kinematic viscosity, a specific weight average molecular weight, and polydispersity index within a defined range.

The present embodiments meet these needs.

DETAILED DESCRIPTION OF THE EMBODIMENTS

Before explaining the system for alpha olefins in detail, it is to be understood that the system is not limited to the particular embodiments and that it is practiced or carried out in various ways.

The present embodiments relate to a homogeneous polymerization catalyst system for polymerization or copolymerization of at least one alpha olefin.

The catalyst system has a Lewis acid (B); an alkyl aluminum (C) in a hexane or a heptane (D); and at least one dry metallocene (A).

The at least one dry metallocene has a molar ratio from 1:1.5 to 1:3 with the Lewis acid.

In embodiments, the at least one dry metallocene has a molar ratio from 1:15 to 1:500 with the alkyl aluminum. The at least one dry metallocene has a transition metal compound.

The Lewis acid is capable of forming an ion pair with the dry metallocene. In embodiments, the amount of the Lewis acid (B) and the amount of alkyl aluminum (C) is from 1 to 3.0 mol and 15.0 to 500 mol, respectively, based on 1 mol of the dry metallocene (A), and the amount of the hexane or heptane (D) is 100 to 100,000 parts by mass, based on 1 part by mass of the Lewis acid (B).

The catalyst system is used to produce a poly alpha olefin from alpha olefin monomers or mixed alpha olefins, wherein the produced poly alpha olefin has a kinematic viscosity at 100 degrees Celsius ranging from 1 cSt to 1000 cSt.

The embodiments save energy polymerizing alpha olefins by using a single solvent system instead of a multiple solvent system having a broad boiling range, or catalyst system that requires a catalyst support.

The embodiments contain a catalyst system that uses a "support free" catalyst; that is, the catalyst composition is not a supported catalyst composition, and hence the support material, such as a dehydrated inorganic oxide, is not required for use and then removed from the resulting polymerized alpha olefin.

The embodiments eliminate the use of multiple solvents in the polymerization catalyst system, making the single solvent easier to contain and reduce the possibility of fires at a chemical plant.

The embodiments reduce emission of volatile organic components during processing and enable more effective control over a single solvent with known vaporization characteristics.

The embodiments prevent waste water pollution by eliminating the need for a supported catalyst in the polymerization process.

The embodiments reduce chance of release of aromatics to atmosphere.

The catalyst system creates olefinic polymer superior in thermal resistance, viscosity, processibility.

The term "about" as used herein is intended to mean approximately, in the region of, roughly, or around. When the term "about" is used in conjunction with a numerical range, it modifies that range by extending the boundaries above and below the numerical values set forth. Unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

The term "activator" as used herein refers to a reagent capable of reacting with another reagent to form a polymerization initiator.

The term "alkyl aluminum" as used herein refers to alkyl aluminum compounds, such as trialkylaluminum compounds that activate the metallocene or the Zeigler-Natta catalyst to advantageously remove polar impurities thus preventing deactivation of the catalyst during the polymerization process. Suitable alkyl aluminum compounds include triisobutylaluminum, trimethylaluminum, triethylaluminum, tri(n-propyl)aluminum, triisopropyl-aluminum, tri(n-butyl)(N-octyl) aluminum.

The term "alpha olefin" as used herein refers to alpha olefins having from 8-20 carbon atoms and include specifically at least one of: a 1-octene, a 1-nonene, a 1-decene, 1-dodecene, 1-tetradecene, 1-hexadecene, 1-octadecene, 1-eicosene, and 1-undecene.

The term "copolymerization" as used herein refers to the process of the invention, by which two or more alpha olefins are reacted in various ratios to form a final poly alpha olefin of various weight percent compositions.

The term "decene" as used herein refers to an alkylene with the formula $C_{10}H_{20}$. Decene contains a chain of ten carbon atoms with one double bond, and this term includes all isomers. The molar mass is 140 g/mol, and a density of 0.74 g/cm3. The melting point is −66 degrees Celsius and the boiling point is 172 degrees Celsius.

The term "dry metallocene" as used herein refers to one or a mixture of metallocene compounds in which the metallocene compound possesses a transition metal in the absence of moisture or solvent. The transition metal is not limited to titanium, zirconium, hafnium, and the like.

The term "inert anhydrous environment" as used herein refers to an environment for polymerization, which is in nitrogen or blanketed with another inert gas or combination of inert gasses.

The term "Kinematic viscosity" as used herein refers to the polymer viscosity in centistokes (cSt) at 100 degrees Celsius.

The term "Lewis acid" as used herein refers to a chemical species that reacts with a Lewis base to form a Lewis adduct. A Lewis base is any species that donates a pair of electrons to a Lewis acid to form a Lewis adduct. For example, OH and NH3 are Lewis bases, because they donate a lone pair of electrons. In the adduct, the Lewis acid and base share an electron pair furnished by the Lewis base.

The term "kinematic viscosity" as used herein refers to the Kinematic viscosity at 100 degrees Celsius ranging from 1 centistokes (cSt) to 50 centistokes (cSt)

The term "molecular weight distribution" or (MWD) as used herein refers to the weight average molecular weight of a polymer (Mw) divided by the number average molecular weight of a polymer (Mn). Mw and Mn are determined as follows:

$$M_n = \frac{\sum_i N_i M_i}{\sum_i N_i} \text{ and } M_w = \frac{\sum_i N_i M_i^2}{\sum_i N_i M_i}$$

The term "near homogeneous solution" as used herein refers to a liquid or a solid phase containing more than one substance that is uniformly dispersed therein. The near homogeneous solution is a mixture of two or more components that have a uniform appearance and composition. The near homogeneous solution is not a heterogeneous suspension which contains components made up of larger and less uniform particles. The near homogeneous solution requires two different substances to be mixed together. Particles in the near homogeneous solution are typically microscopic and <5 microns. Colloids are homogeneous solutions with particles similar to size of those in heterogeneous suspensions.

The term "undecene" as used herein refers to a 1-undecene, having a molecular weight from 154 g/mol, a density of 0.7 g/mL, a molar volume of 200-204 ML/mol, a refractive index of 1.4, a dielectric constant of 2.17 a melting point of −27 to −25 degrees Celsius, a boiling point of 190-200 degrees Celsius, and a molecular formula of $C_{11}H_{22}$. The term refers to isomers of the alpha olefins.

The poly alpha olefin polymerized by the homogeneous polymerization catalyst does not use an alpha olefin selected from the group consisting of 2-butene, 2-pentene, 2-hexene, 3-hexene, 2-heptene, 3-heptene, 2-octene, 3-octene, 4-octene, and 5-decene.

The advantageous properties of the formed polymers are incorporated into various viscosity modifiers, a rubber plasticizer, and lubricants.

This process specifically excludes the use of vulcanizing agents, accelerators, or extender oils.

The present embodiments also provide a method of preparing an olefinic polymer comprising the step of polymerizing olefinic monomers in the presence of the catalyst composition without a catalyst support.

In embodiments, a specific example of the olefinic monomer is 1-heptene, 1-octene, 1-decene, 1-undecene, 1-dodecene, 1-tetradecene, 1-hexadecene, 1-octadecene, 1-eicosene, 1-undecene and the like; also two or more monomers are copolymerized among them by mixture. The alpha olefin has from 8 carbon atoms to 20 carbon atoms.

In embodiments, the molecular weight distribution (Mw/Mn) of the olefinic polymer is not limited to preferably two or more.

In embodiments, the weight average molecular weight (Mw) of the olefinic polymer is from about 250 to about 20,000, and is from about 250 to about 12,000; however, the weight average molecular weight (Mw) is not limited to this.

The density of the polymerized olefinic polymer is from 0.082 g/cm$^3$ to about 0.095 g/cm$^3$.

Therefore, the formed olefinic polymer according to the present embodiments is superior in thermal resistance, viscosity, processibility, and the like, and thus the olefinic polymer is applied variously according to its use.

Example 1

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 60 minutes under an oxygen free inert anhydrous environment yielding a near homogeneous solution.

Add 0.01 grams (0.0231 mmole) of a dry metallocene compound known as isopropylidene(cyclopentadienyl 9-fluorenyl) zirconium dichloride to the near homogeneous solution and stir to form an aliphatic hydrocarbon soluble polymerization initiator.

The dry metallocene is in a molar ratio 1:1.5 with the Lewis acid and a molar ratio of 1:123 with the alkyl aluminum. Then, stir to form a near homogeneous metallocene enriched polymerization initiator for 60 minutes.

An alpha olefin of 1-decene is polymerized with the metallocene enriched polymerization initiator by adding 1.0 mL of the near homogeneous metallocene enriched polymerization initiator to a stirred batch reactor containing 1800 mL (1200 grams) of dry hexane at 60 degrees Celsius and 200 grams of dry 1-decene and 2.5 mL of 1.0 Molar triisobutyl aluminum as a moisture and impurities scavenger to yield a 1-decene based poly alpha olefin with a Kinematic viscosity at 100 degrees Celsius of 400 cSt. It is expected that the final polymerized alpha olefin has a molecular weight range of 3000-4000.

Example 2

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 60 minutes under an oxygen free inert anhydrous environment yielding a near homogeneous solution.

Add 0.01 grams (0.0231 mmole) of a dry metallocene compound known as isopropylidene(cyclopentadienyl 9-fluorenyl) zirconium dichloride to the near homogeneous solution and stir to form an aliphatic hydrocarbon soluble polymerization initiator.

The dry metallocene is in a molar ratio 1:1.5 with the Lewis acid and a molar ratio of 1:123 with the alkyl aluminum. Then, stir to form a near homogeneous metallocene enriched polymerization initiator.

An alpha olefin of 1-decene is polymerized with the metallocene enriched polymerization initiator by adding 1.0 mL of the near homogeneous metallocene enriched polymerization initiator to a stirred batch reactor containing 1800 mL of dry hexane at 60 degrees Celsius and 200 grams of dry 1-decene and 2.5 mL of 1.0 Molar triisobutyl aluminum as a moisture and impurities scavenger to yield a 1-decene based poly alpha olefin with a Kinematic viscosity at 100 degrees Celsius of 380 cSt. It is expected that the final polymerized alpha olefin has a molecular weight range of 3000-4000.

Example 3

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 10 minutes under an oxygen free inert anhydrous environment yielding a near homogeneous solution.

Add 0.01 grams (0.0231 mmole) of a dry metallocene compound known as rac-ethylenebis(indenyl) zirconium dichloride to the near homogeneous solution and stir for 60 minutes to form an aliphatic hydrocarbon soluble polymerization initiator.

The dry metallocene is in a molar ratio 1:1.5 with the Lewis acid and a molar ratio of 1:123 with the alkyl aluminum. Then, stir to form a near homogeneous metallocene enriched polymerization initiator.

An alpha olefin of 1-decene is polymerized with the metallocene enriched polymerization initiator by adding 1.0 mL of the near homogeneous metallocene enriched polymerization initiator to a stirred batch reactor containing 1800 mL of dry hexane at 60 degrees Celsius and 200 grams of dry 1-decene and 2.5 mL of 1.0 Molar triisobutyl aluminum as a moisture and impurities scavenger to yield a 1-decene based poly alpha olefin with a Kinematic viscosity at 100 degrees Celsius of 250 cSt. It is expected that the final polymerized alpha olefin has a molecular weight range of 2500-3000.

Example 4

An alpha olefin of 1-decene is polymerized with the metallocene enriched polymerization initiator prepared in Example 3 by adding 1.0 mL of the near homogeneous metallocene enriched polymerization initiator to a stirred batch reactor containing 200 grams of dry 1-decene at 60 degrees Celsius and 2.5 mL of 1.0 Molar triisobutyl aluminum as a moisture and impurities scavenger to yield a 1-decene based poly alpha olefin with a Kinematic viscosity at 100 degrees Celsius of 250 cSt. It is expected that the final polymerized alpha olefin has a molecular weight range of 2500-3000.

Example 5

An alpha olefin of 1-decene is polymerized with the metallocene enriched polymerization initiator prepared in Example 3 by adding 1.0 mL of the near homogeneous metallocene enriched polymerization initiator to a stirred batch reactor containing 200 grams of dry 1-decene at 110 degrees Celsius and 2.5 mL of 1.0 Molar triisobutyl aluminum as a moisture and impurities scavenger to yield a 1-decene based poly alpha olefin with a Kinematic viscosity at 100 degrees Celsius of 25 cSt. It is expected that the final polymerized alpha olefin has a molecular weight range of 500-700.

Example 6

An alpha olefin of 1-decene is polymerized with the metallocene enriched polymerization initiator prepared in Example 3 by adding 1.0 mL of the near homogeneous metallocene enriched polymerization initiator to a stirred batch reactor containing 200 grams of dry 1-decene at 60 degrees Celsius and pressurized with dry nitrogen to 200 psig and 2.5 mL of 1.0 Molar triisobutyl aluminum as a moisture and impurities scavenger to yield a 1-decene based poly alpha olefin with a Kinematic viscosity at 100 degrees Celsius of 270 cSt. It is expected that the final polymerized alpha olefin has a molecular weight range of 2500-3000.

Example 7

Combine 0.018 grams of tris-pentafluorophenyl borane (Lewis acid (B)) and 1.9 mL of 1.5 molar modified methyl aluminoxane (MMAO) (alkyl aluminum (C)) in isohexane (D) to a 50 ml reaction flask. Then, dilute to 5 mL with dry isohexanes, yielding a coordination complex.

The coordination complex is then stirred continuously at room temperature, for 10 minutes under an oxygen free inert anhydrous environment yielding a near homogeneous solution.

Add 0.01 grams (0.0231 mmole) of a dry metallocene compound known as rac-dimethylsilylbis(tetrahydro indenyl) zirconium dichloride to the near homogeneous solution and stir for 30 minutes to form an aliphatic hydrocarbon soluble polymerization initiator.

The dry metallocene is in a molar ratio 1:1.65 with the Lewis acid and a molar ratio of 1:130 of dry metallocene with the alkyl aluminum. Then, stir for 10 minutes to form a near homogeneous metallocene enriched polymerization initiator.

An alpha olefin of 1-decene is polymerized with the metallocene enriched polymerization initiator by adding 1.0 mL of the near homogeneous metallocene enriched polymerization initiator to a stirred batch reactor containing 200 grams of dry 1-decene at 80 degrees Celsius pressurized to 40 psig with dry nitrogen and 1.0 mL of 1.0 Molar triisobutyl aluminum as a moisture and impurities scavenger to yield a 1-decene based poly alpha olefin with a Kinematic viscosity at 100 degrees Celsius of 87 cSt. It is expected that the final polymerized alpha olefin has a molecular weight range of 500-1000.

Example 8

An alpha olefin of 1-decene is polymerized with the metallocene enriched polymerization initiator prepared in Example 7 by adding 1.0 mL of the near homogeneous metallocene enriched polymerization initiator to a stirred batch reactor containing 200 grams of dry 1-decene at 80 degrees Celsius pressurized to 10 psig with dry hydrogen followed by pressurization to 40 psig with dry nitrogen and 1.0 mL of 1.0 Molar triisobutyl aluminum as a moisture and impurities scavenger to yield a 1-decene based poly alpha olefin with a Kinematic viscosity at 100 degrees Celsius of 40 cSt. It is expected that the final polymerized alpha olefin has a molecular weight range of 250-400.

Example 9

An alpha olefin of 1-decene is polymerized with the metallocene enriched polymerization initiator prepared in Example 7 by adding 1.0 mL of the near homogeneous metallocene enriched polymerization initiator to a stirred batch reactor containing 200 grams of dry 1-decene at 80 degrees Celsius pressurized to 20 psig with dry hydrogen followed by pressurization to 40 psig with dry nitrogen and 1.0 mL of 1.0 Molar triisobutyl aluminum as a moisture and impurities scavenger to yield a 1-decene based poly alpha olefin with a Kinematic viscosity at 100 degrees Celsius of 10 cSt. It is expected that the final polymerized alpha olefin has a molecular weight range of 250-300.

Example 10

An alpha olefin of 1-octene is polymerized with the metallocene enriched polymerization initiator prepared in Example 7 by adding 1.0 mL of the near homogeneous metallocene enriched polymerization initiator to a stirred batch reactor containing 200 grams of dry 1-octene at 80 degrees Celsius pressurized to 40 psig with dry nitrogen and 1.0 mL of 1.0 Molar triisobutyl aluminum as a moisture and impurities scavenger to yield a 1-octene based poly alpha olefin with a Kinematic viscosity at 100 degrees Celsius of 70 cSt. It is expected that the final polymerized alpha olefin has a molecular weight range of 500-1000.

In embodiments, the molar ratio of the dry metallocene to Lewis acid is: a molar ratio 1:1 with the Lewis acid, a molar ratio of 1:2 with the Lewis acid, a molar ratio of 1:3 with the Lewis acid and all the numbers in between.

In embodiments, the molar ratio of the dry metallocene to alkyl aluminum is: a molar ratio 1:15 with the alkyl aluminum, a molar ratio of 1:100 with the alkyl aluminum, a molar ratio of 1:500 with the alkyl aluminum and all the numbers in between.

In embodiments, the molecular weight of the polymerized alpha olefin is 5000, 10,000, 20,000 and all the numbers in between using the metallocene enriched polymerization initiator.

In embodiments, the amount of hexane or heptane in the final polymerizated alpha olefin is from 100 to 100,000 parts by mass based on 1 part by mass of the Lewis acid.

In embodiments, the stirring to form the near homogeneous solution is from 2 minutes to 60 minutes.

In embodiments, the stirring to form the near homogeneous metallocene enriched polymerization initiator is from 2 minutes to 60 minutes.

The temperature of polymerization is maintained in a range from 40 degrees Celsius to 120 degrees Celsius.

In embodiments, the pressure for the polymerization is maintained from 2 psig to 200 psig.

Example 11

Ziegler Natta Catalyst Preparation (Example without Metallocene)

Combine 2 ml of 0.05 molar vanadium oxytrichloride and 1.4 ml of 0.5 molar dichlorophenyl acetic acid ethyl ester to a 50 ml flask. Then dilute solution to 5.0 ml with dry isohexane. This diluted solution is stirred for 1-2 minutes to form a homogeneous solution.

An alpha olefin of 1-decene is polymerized with the Ziegler Natta catalyst prepared as described above by adding 0.2 mL of the prepared Zeigler Natta catalyst solution to a 50 mL stirred reaction vessel containing 15 grams of dry 1-decene at 80 degrees Celsius pressurized to 2 psig with dry nitrogen and 0.2 mL of 1.0 Molar ethylaluminum sesquichloride as a moisture and impurities scavenger, to yield a 1-decene based poly alpha olefin with a weight average molecular weight of 20,000 Daltons as determined using Gel Permeation Chromatography.

Example 12

Ziegler Natta and Metallocene Example

A Ziegler Natta catalyst is formed as described in Example 11.

Metallocene is added to the Ziegler Natta Catalyst in a molar ratio of Zeigler Natta to metallocene of 0.1:1.

0.2 ml of the combination of metallocene and Ziegler Natta catalyst are added to a 50 ml stirred reaction vessel containing 15 grams of dry 1-decene at 80 degrees Celsius pressurized to 2 psig with dry nitrogen with 0.2 ml of 1.0 Molar triisobutyl aluminum as a moisture and impurities scavenger to yield a 1-decene based poly alpha olefin with a weight average molecular weight of 30,000 Daltons as determined Gel Permeation Chromatography with a Kinematic viscosity at 100 degrees Celsius of 1000 cSt. It is expected that the final polymerized alpha olefin has a molecular weight range of 5000-20000.

Example 13

Ziegler Natta and Metallocene Example

A Ziegler Natta catalyst is formed as described in Example 11.

Metallocene is added to the Ziegler Natta Catalyst in a molar ratio of Zeigler Natta to metallocene of 1:1.

0.2 ml of the combination of metallocene and Ziegler Natta catalyst are added to a 50 ml stirred reaction vessel containing 15 grams of dry 1-decene at 80 degrees Celsius pressurized to 2 psig with dry nitrogen with 0.2 ml of 1.0 Molar triisobutyl aluminum as a moisture and impurities scavenger to yield a 1-decene based poly alpha olefin with a weight average molecular weight of 30,000 Daltons as determined Gel Permeation Chromatography with a Kinematic viscosity at 100 degrees Celsius of 500 cSt. It is expected that the final polymerized alpha olefin has a molecular weight range of 5000-20000.

In embodiments, a homogeneous polymerization catalyst for polymerization or copolymerization of at least one alpha olefin has a Lewis acid (B), an alkyl aluminum (C) in a hexane or heptane (D), and at least one dry metallocene (A); wherein the dry metallocene is in a molar ratio from 1:1.5 to 1:3 with the Lewis acid and a molar ratio from 1:15 to 1:500 of the dry metallocene to the alkyl aluminum.

The dry metallocene (A) has a transition metal compound.

In embodiments, the Lewis acid (B) is capable of forming an ion pair with the dry metallocene (A). The amount of the Lewis acid (B) and the alkyl aluminum (C) is 1 mol to 3.0 mol and 15.0 mol to 500.0 mol, respectively, based on 1 mol of the dry metallocene (A), and the amount of the hexane or heptane (D) is 100 to 100,000 parts by mass, based on 1 part by mass of the Lewis acid (B) for producing a poly alpha olefin from alpha olefin monomers or mixed alpha olefins, wherein a produced poly alpha olefin has a kinematic viscosity at 100 degrees Celsius ranging from 1 to 1000 cSt.

The alpha olefin for polymerization is from 8 to 20 carbon atoms.

In embodiments, a Zeigler-Natta catalyst is blended with the dry metallocene in a molar ratio of Zeigler-Natta to metallocene from 0.1:1 to 1:1.

The dry metallocene (A) is a metallocene complex comprising a non-cross-linked ligand, or a metallocene complex comprising cross-linked ligand.

The dry metallocene (A) is a non-cross-linked ligand selected from the group consisting of biscyclopentadienylzirconium dichloride, bis(n-butylcyclopentadienyl)zirconium dichloride, bis(pentamethylcyclopentadienyl)zirconium dichloride, bisindenylzirconium dichloride, and bis(tetramethylcyclopentadienyl)zirconium dichloride.

The dry metallocene (A) is a cross-linked ligand selected from the group consisting of dimethylsilylene(tetramethylcyclopentadienyl)(3-tert-butyl-5-methyl-2-phe-noxy)zirconium dichloride, dimethylsilylene(tetramethylcyclopentadienyl)(tert-butylamido)zirconium dichloride, dimethylsilylenebis(2-methyl-4,5-benzoindenyl)zirconium dichloride, dimethylsilylenebis(2-methyl-4-phenylindenyl) zirconium dichloride, dimethylsilylenebis(2-methyl-4-naphthylindenyDzirconium dichloride, dimethylsilylenebis(2-methylindenyl)zirconium dichloride, ethylenebis(2-methylindenyl)zirconium dichloride, and ethylenebisindenylzirconium dichloride.

The Lewis acid or borate compound (B) is a coordination complex compound selected from the group consisting of triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

The Lewis acid or borate compound (B) is a coordination complex compound selected from the group consisting of ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate.

The alkyl aluminum (C) is selected from the group consisting of trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

The alkyl aluminum (C) is selected from the group consisting of tetramethyldialumoxane, tetraisobutyldialumoxane, methylalumoxane, ethylalumoxane, butylalumoxane, and isobutylalumoxane.

While these embodiments have been described with emphasis on the embodiments, it should be understood that within the scope of the appended claims, the embodiments might be practiced other than as specifically described herein.

What is claimed is:

1. A homogeneous polymerization catalyst system for polymerization or copolymerization of at least one alpha olefin prepared by contacting:
   a. a coordination complex (B) selected from the group consisting of: a ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, and silver tetrafluoroborate, trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride;
   b. an alkyl aluminum (C) in hexane or heptane; and
   c. at least one dry metallocene (A), wherein the molar ratio of the metallocene to the coordination complex is from 1:1.5 to 1:3 and the molar ratio of the metallocene to the alkyl aluminum, is from 1:15 to 1:500, wherein the metallocene is an unbridged or a bridged metallocene complex; and
   wherein the metallocene is capable of forming an ion pair with the coordination complex, and wherein the amount of the coordination complex is 1 mol to 3.0 mol, based on 1 mol of the metallocene, and the amount of hexane or heptane is 100 parts by mass to 100,000 parts by mass, based on 1 part by mass of the coordination complex for producing a polyalpha-olefin with a kinematic viscosity at 100 degrees Celsius ranging from 1 cSt to 1000 cSt.

2. The homogeneous polymerization catalyst system of claim 1, wherein the alpha olefin for polymerization has from 8 carbon atoms to 20 carbon atoms.

3. The homogeneous polymerization catalyst system of claim 1, further comprising a Zeigler-Natta catalyst blended with homogeneous metallocene catalyst system.

4. The homogeneous polymerization catalyst system of claim 1, wherein the unbridged metallocene complex is selected from the group consisting of: biscyclopentadienylzirconium dichloride, bis(n-butylcyclopentadienyl)zirconium dichloride, bis(pentamethylcyclopentadienyl)zirconium dichloride, bisindenyizirconium dichloride, and bis(tetramethylcyclopentadienyl)zirconium dichloride.

5. The homogeneous polymerization catalyst system of claim 1, wherein the bridged metallocene complex is selected from the group consisting of: dimethylsilylene(tetramethylcyclopentadienyl)(3-tert-butyl-5-methyl-2-phenoxy)zirconium dichloride, dimethylsilylene(tetramethylcyclopentadienyl)(tert-butylamido)zirconium dichloride, dimethylsilylenebis(2-methyl-4,5-benzoindenyl)zirconium dichloride, dimethylsilylenebis(2-methyl-4-phenylindenyl) zirconium dichloride, dimethylsilylenebis(2-methyl-4-naphthylindenyDzirconium dichloride, dimethylsilylenebis(2-methylindenyl)zirconium dichloride, ethylenebis(2-methylindenyl)zirconium dichloride, and ethylenebisindenylzirconium dichloride.

6. The homogeneous polymerization catalyst system of claim 1, wherein the alkyl aluminum is selected from the group consisting of: trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

7. The homogeneous polymerization catalyst system of claim 1, wherein the alkyl aluminum is selected from the group consisting of: tetramethyldialumoxane, tetraisobutyldialumoxane, methylalumoxane, ethylalumoxane, butylalumoxane, and isobutylalumoxane.

\* \* \* \* \*